United States Patent
Park et al.

(10) Patent No.: US 7,340,141 B2
(45) Date of Patent: Mar. 4, 2008

(54) OPTICAL FIBER, AND OPTICAL TRANSMISSION LINE AND OPTICAL TRANSMISSION SYSTEM USING THE SAME

(75) Inventors: Hye-Young Park, Seoul (KR); Jun-Ho Mun, Gyeonggi-do (KR)

(73) Assignee: LS Cable Ltd., Seoul (KR)

( * ) Notice: Subject to any disclaimer, the term of this patent is extended or adjusted under 35 U.S.C. 154(b) by 0 days.

(21) Appl. No.: 11/631,754

(22) PCT Filed: Jul. 13, 2004

(86) PCT No.: PCT/KR2004/001738

§ 371 (c)(1),
(2), (4) Date: Jan. 5, 2007

(87) PCT Pub. No.: WO2006/006748

PCT Pub. Date: Jan. 19, 2006

(65) Prior Publication Data

US 2007/0263970 A1 Nov. 15, 2007

(30) Foreign Application Priority Data

Jul. 8, 2004 (KR) .................. 10-2004-0053169

(51) Int. Cl.
*G02B 6/02* (2006.01)
(52) U.S. Cl. .................................... 385/127
(58) Field of Classification Search ............. 385/127
See application file for complete search history.

(56) References Cited

U.S. PATENT DOCUMENTS

| | | | |
|---|---|---|---|
| 6,396,987 B1 | 5/2002 | de Montmorillon et al. | |
| 6,618,532 B1* | 9/2003 | Sasaoka et al. | 385/123 |
| 6,633,714 B2* | 10/2003 | de Montmorillon et al. | 385/124 |
| 2002/0067903 A1* | 6/2002 | Fleury et al. | 385/123 |
| 2003/0063878 A1* | 4/2003 | Matsuo et al. | 385/123 |

FOREIGN PATENT DOCUMENTS

JP 01-169410 A 7/1989

* cited by examiner

*Primary Examiner*—Ellen E. Kim
(74) *Attorney, Agent, or Firm*—Jones Day

(57) ABSTRACT

Disclosed is an optical fiber suitable for an optical transmission line used in WDM system, particularly a single-mode optical fiber whose zero-dispersion wavelength is positioned in a short wavelength band (less than 1,370 mm) so as to enable high-speed mass-storage signal transmission over S-C-L bands (1,460~1,625 nm) and whose dispersion value and effective sectional area are optimized. In the optical fiber, a dispersion value is at least 9 ps/nm-km at 1,460 nm, an effective sectional area is 45-65 $\mu m^2$ at 1,460 rim, a zero-dispersion wavelength exists at 1,370 nm or less, and a dispersion slope is positive. In addition, RDS (Relative Dispersion Slope) is 0.0032~0.0038 $nm^{-1}$ at 1,550 nm. Thus, the optical fiber enables to repress non-linearity and signal distortion to the maximum during 320 km repeaterless transmission with a transmission rate of 10 Gb/s or more over S-C-L bands, a channel spacing of 50 GHz or less, 16 channels, and a signal power of 0 dBm/ch or 2 dBm/ch.

10 Claims, 4 Drawing Sheets

OPTICAL FIBER, AND OPTICAL TRANSMISSION LINE AND OPTICAL TRANSMISSION SYSTEM USING THE SAME

TECHNICAL FIELD

The present invention relates to an optical fiber suitable for an optical transmission line used in wavelength division multiplexing (WDM) transmission system, particularly to a single-mode optical fiber whose zero-dispersion wavelength is positioned in a short wavelength band (less than 1,370 mm) so as to enable high-speed mass-storage signal transmission over S-C-L bands (1,460 to 1,625 nm) and whose dispersion value and effective sectional area are optimized.

BACKGROUND ART

In the case of a wavelength division multiplexing (WDM) transmission system, transmission capacity may be effectively enhanced by increasing a transmission rate, reducing a channel spacing or widening a transmission wavelength range.

Recently, the transmission rate of the system has increased from 2.5 Gb/s to 10 Gb/s, and the transmission system having 40 Gb/s will be generally used in the near future. A power per channel is increased so as to enhance the transmission rate, but noises and non-linearity in optical fibers are increased and then a transmission property is deteriorated if the power per channel is increased as described above.

In the system which is transmitted in a long distance at a transmission rate of 40 Gb/s, the noses may be lowered by using a Raman amplifier instead of a conventional EDFA (Erbium Doped Fiber Amplifier). Also, because tolerance of a signal distortion system by dispersion is proportionate to an inverse square of the transmission rate, the tolerance is decreased to a level of $\frac{1}{16}$ at a receiving end if the transmission rate is increased 4 times. Accordingly, precise dispersion compensation is required so that cumulative dispersion of the transmission channel cannot exceed the tolerance in the system with a transmission rate of 40 Gb/s. For this purpose, RDS (Relative Dispersion Slope) of a dispersion-compensation optical fiber should be similar to RDS of an optical fiber used as a transmission line (wherein, RDS is a value obtained by dividing a dispersion slope by the dispersion).

In order to enhance the transmission capacity, a channel spacing of the system has been narrowed from 200 GHz (1.6 nm) and 100 GHz (0.8 nm) to 50 GHz (0.4 nm) and 25 GHz (0.2 nm) or less. However, as the channel spacing becomes gradually narrowed, signal distortion is caused by a four-wave-mixing phenomenon, or a non-linear phenomenon such as cross phase modulation and XPM (Cross Phase Modulation). Especially, if the low dispersion of the optical fiber is nearly close to the phase-matching condition, cross talk power is caused by a four wave mixing, finally causing a signal distortion.

Intensity of the cross talk power is associated with a power per channel, a channel spacing of the system, and dispersion and effective sectional area of the optical fiber. If the power per channel is reduced to decrease intensity of the cross talk power, an optical signal noise ratio becomes worse, and therefore transmission distance gets short, resulting in an increased cost of the system upon long-distance transmission.

Also, intensity of the cross talk power is lowered as dispersion of the optical fiber increases, but its loss is increased since a length of the used optical fiber for dispersion compensation gets longer in proportion to the dispersion of the optical fiber. Accordingly, the dispersion of the optical fiber should be optimized depending on properties of the system.

Also, an effective sectional area of the optical fiber, which is referred to as light intensity per unit area, is useful to inhibit a non-linear phenomenon as the effective sectional area is greater.

It is not preferred to increase the transmission capacity by using other wavelength ranges than C-band (1,530~1,565 nm) and L-band (1,565~1,625 nm) because using longer wavelength ranges than L-band makes a bending loss of the optical fiber be increased. Accordingly, it is useful to use S-band (1,460~1,530 nm) belonging to shorter wavelength ranges rather than C-band. In this case, a sufficient dispersion value should, however, be obtained near 1,460 nm to inhibit a four-wave mixing in a transmission wavelength range. Also, the four-wave mixing (FWM) should be inhibited by escaping a zero-dispersion wavelength of the optical fiber used as a transmission line from the S-C-L bands. If Raman amplification is used, the zero-dispersion wavelength of the optical fiber should be shifted to a wavelength band shorter than a Raman pump wavelength so as to prevent the four-wave mixing between a pump wavelength and a signal wavelength. Also, Raman gain efficiency should be improved by reducing the loss of the optical fiber and adjusting the effective sectional area.

There have been proposed various optical fibers as the WDM transmission systems are varied with their development.

U.S. Pat. No. 5,327,516 disclose an optical fiber having dispersion of 1.5~4 ps/nm-km at 1,550 nm so as to improve the transmission property deteriorated because the four-wave mixing is significantly increased if conventional dispersion shift optical fibers have a dispersion value nearly close to zero at 1,550 nm. However, the optical fiber proposed in the U.S. Pat. No. 5,327,516 may be used in the system enabling 360 km repeaterless transmission with a transmission rate of at least 5 Gb/s, a channel spacing of 1.0~2.0 nm, and at least 4 channels, but it has a problem that the transmission property may be deteriorated due to the signal distortion by the four-wave mixing or the cross phase modulation as the non-linearity increases if it is used in the system having a transmission rate of at least 10 Gb/s, and a channel spacing of 1.0 nm or less.

Also, U.S. Pat. No. 5,835,655 discloses an optical fiber in which a zero-dispersion wavelength is shifted to escape from a transmission wavelength range, and an effective sectional area is increased to at least 70 $\mu m^2$ to prevent a non-linear phenomenon. The optical fiber of the U.S. Pat. No. 5,835,655 may prevent the non-linear phenomenon because it has the effective sectional area of at least 70 $\mu m^2$, and may inhibit a signal distortion by a four-wave mixing in the C-band because a zero-dispersion wavelength is located in a wavelength range of 1,500~1,540 nm or 1,560~1,600 nm. However, the signal distortion by the four-wave mixing may appear in a pump wavelength range because the zero-dispersion wavelength is located in the S-band, for example near a pump wavelength for Raman amplification U.S. Pat. No. 6,396,987 discloses an optical fiber capable of reducing a cost for the dispersion compensation, compared to general single mode optical fibers in a system having a transmission rate of 40 Gb/s. That is to say, the optical fiber of the U.S. Pat. No. 6,396,987 has dispersion of 6~10 ps/nm-km, a dispersion slope of 0.07 ps/nm$^2$-km or less, and an effective sectional area of at least 60 $\mu m^2$ at a 1,550 nm. In this case, it has a problem that the signal distortion by the four-wave mixing arises in a pump wavelength range because the zero-dispersion wavelength is located near 1,460 nm, for example near a pump wavelength for Raman amplification.

DISCLOSURE OF INVENTION

The present invention is designed to solve the problems of the prior art, and therefore it is an object of the present invention to provide an optical fiber suitable as an optical transmission line used in a WDM transmission system.

Also, it is another object of the present invention to provide an optical fiber in which a zero-dispersion wavelength, a dispersion, and an effective sectional area are optimized to enable a long-distance transmission (320 km repeaterless transmission) without signal distortion due to a low transmission loss in the system with a high speed (at least 10 Gb/s) and a mass storage (a channel spacing of 50 GHz or less).

Also, it is still another object of the present invention to provide an optical fiber which enables a long-distance transmission in a wide wavelength range (S-C-L bands) without the dispersion compensation.

Also, it is further still another object of the present invention to provide an optical transmission line using the above-mentioned optical fiber, and an optical communication system using the optical transmission line.

These and other objects and advantages of the present invention will be described in detail, as follows. Also, these and other objects and advantages of the present invention will be realized by means and combinations as described in accompanying claims.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

The optical fiber of the present invention is suitable to be used as a transmission line of the WDM (Wavelength Division Multiplexing) optical communication system which has a transmission rate of at least 10 Gb/s, a channel spacing of 50 GHz or less and a repeaterless transmission distance of at least 320 km, and in which a Raman amplifier and/or an EDFA (Erbium Doped Fiber Amplifier) are used to amplify an optical signal. In particular, the optical fiber of the present invention may transmit an optical signal through a S-band (1,460~1,530 nm), as well as a conventional C-band (1,530~1,565 nm) and a conventional L-band (1,565~1,625 nm) without signal distortion.

For this purpose, in the optical fiber of the present invention, a dispersion value is at least 9 ps/nm-km at 1,460 nm, an effective sectional area is 45 $\mu m^2$~65 $\mu m^2$ at 1,460 nm, a zero-dispersion wavelength exists at 1,370 nm or less, and a dispersion slope is positive. Also, RDS (Relative Dispersion Slope) at 1,550 nm is preferably in a range of 0.0032~0.0038 $mm^{-1}$.

Such optical properties (the zero-dispersion wavelength, RDS, the dispersion, the dispersion slope, the effective sectional area, a cut-off wavelength, etc.) are realized by adjusting a refractive index distribution that is a change of a refractive index in a radial direction of the optical fiber. For this purpose, the optical fiber of the present invention is designed to have a stepped refractive index profile, as shown in FIGS. 1 and 2.

The optical fiber of the present invention is located in an optically central axis, and includes a core region having a relatively high refractive index, and a clad region surrounding the core region and having a relatively low refractive index.

Figure 1:
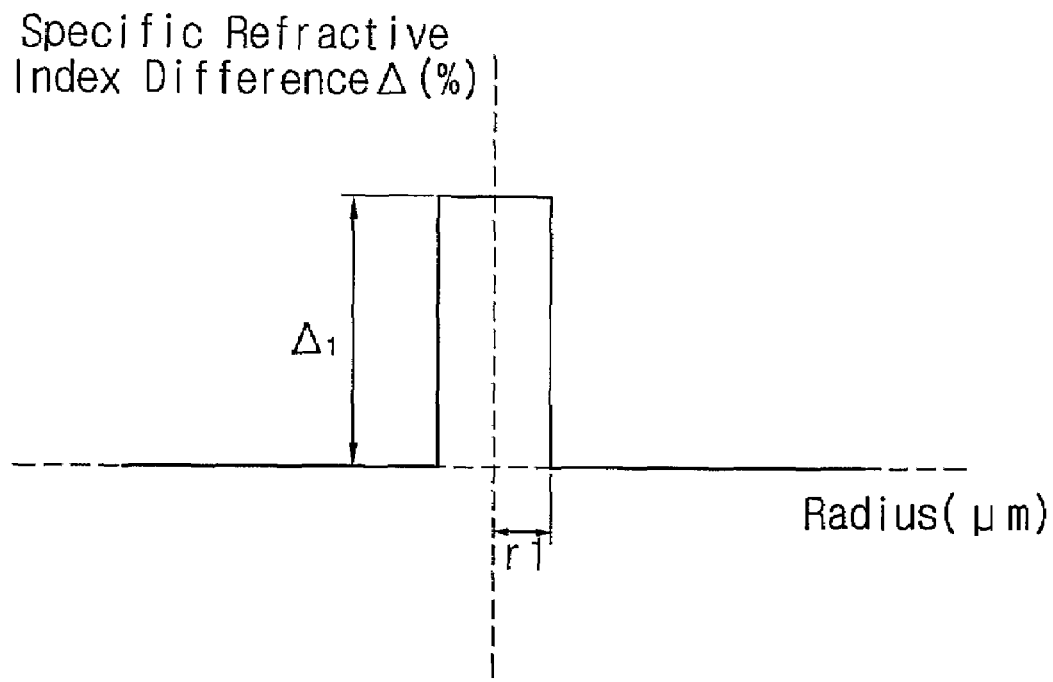
FIG. 1 is a diagram showing a refractive index profile of an optical fiber according to first and second embodiments of the present invention.
Figure 2:
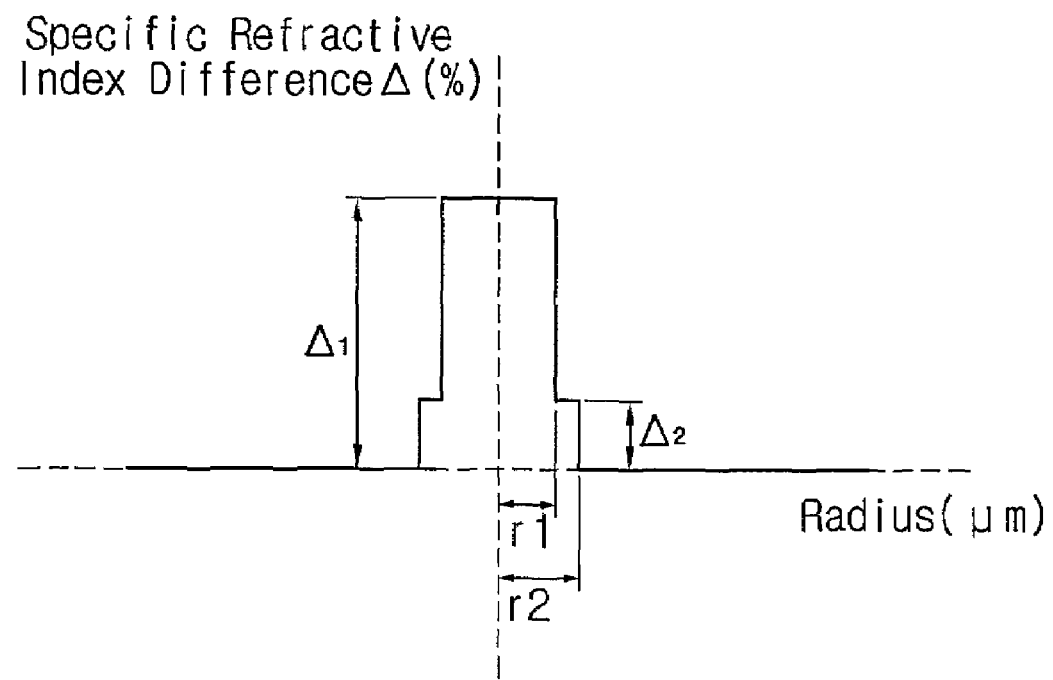
FIG. 2 is a diagram showing a refractive index profile of an optical fiber according to third and fourth embodiments of the present invention.

The optical fiber according to the first embodiment of the present invention includes a core region having a radius $r_1$ from the optically central axis and a specific refractive index difference $\Delta_1$; and a clad region surrounding the core region, and having a radius $r_2$ from the optically central axis and a specific refractive index difference $\Delta_2$ (see FIG. 1).

That is to say, the optical fiber of the first embodiment has a stepped refractive index profile where the radius is $r_1 < r_2$, and the specific refractive index difference is $\Delta_1 > \Delta_2$, and $\Delta_1 > 0$, as shown in FIG. 1 (wherein, $\Delta_1(\%) = [(n_{core} - n_{clad})/n_{clad}] \times 100$, $n_{core}$: a refractive index of the core region, and $n_{clad}$: a refractive index of the clad region).

More particularly, the core region preferably has a radius $r_1$ of 3.5~4.1 $\mu m$, and a specific refractive index difference $\Delta_1$ of 0.4~0.6%, and more preferably a radius $r_1$ of 3.56~4.00 $\mu m$, and a specific refractive index difference $\Delta_1$ of 0.46~0.56%.

Also, the optical fiber according to the second embodiment of the present invention includes a first core region having a radius $r_1$ from the optically central axis and a specific refractive index difference $\Delta_1$; a second core region surrounding the first core region and having a radius $r_2$ from the optically central axis and a specific refractive index difference $\Delta_2$; and a clad region surrounding the second core region and having a radius $r_3$ from the optically central axis and a specific refractive index difference $\Delta_3$ (see FIG. 2).

That is to say, the optical fiber of the second embodiment has a stepped refractive index profile where the radius is $r_1 < r_2 < r_3$, and the specific refractive index difference is $\Delta_1 > \Delta_2 > \Delta_3$, and $\Delta_1, \Delta_2 > 0$, as shown in FIG. 2 (wherein, $\Delta_1(\%) = [(n_1 - n_c)/n_c] \times 100$, $\Delta_2(\%) = [(n_2 - n_c)/n_c] \times 100$, $n_1$: a refractive index of the first core region, $n_2$: a refractive index of the second core region, and $n_c$: a refractive index of the clad region).

The first core region preferably has a radius $r_1$ of 3.05±0.6 $\mu m$, and a specific refractive index difference $\Delta_1(\%)$ of 0.53±0.03%; and the second core region preferably has a radius $r_2$ of 4.53±0.6 $\mu m$, and a specific refractive index difference $\Delta_2$ of −0.097±0.03%.

More preferably, the first core region has a radius $r_1$ of 3.64±0.6 $\mu m$, and a specific refractive index difference $\Delta_1$ of 0.49±0.03%; the second core region has a radius $r_2$ of 4.76±0.6 μm, and a specific refractive index difference $\Delta_2$ of −0.098±0.03%.

Another embodiment of the present invention relates to an optical transmission line using the above-mentioned optical fiber, and an optical communication system using the optical transmission line as at least a part of the optical transmission line.

The Raman amplification relates to a method for amplifying a transmission signal power using SRS (Stimulated Raman Scattering) which is referred to as a non-linear phenomenon of the optical fiber, and the transmission signal power is transmitted from a pump signal to a transmission signal by SRS. A Raman amplification gain spectrum may be flattened by a plurality of the pumps if it has a wide transmission wavelength range. At this time, if the zero-dispersion wavelength of the optical fiber is positioned between wavelength ranges of the pump signal and the transmission signal, an optical signal noise ratio is increased and transmission properties are deteriorated due to cross talk between a plurality of the pump signals, and cross talk between a noise signal generated by the cross talk and a transmission signal. Accordingly, in the optical fiber used in the system adopting the Raman amplifier, its zero-dispersion wavelength should be lower than that of a pump signal wavelength. Particularly, the zero-dispersion wavelength of the optical fiber should be shifted below 1,400 nm, and especially below 1,370 nm if Raman-amplified optical signals are transmitted through not only the C-band or the L-band but also the S-band.

Accordingly, the zero-dispersion wavelength of the optical fiber according to the present invention exists at 1,370 nm or less.

Also, the optical fiber according to the present invention should have an optimized dispersion value and an optimized effective sectional area to satisfy a transmission property Q of at least 6 when the 320 km repeaterless transmission is carried out in the system with a transmission rate of at least 10 Gb/s and a channel spacing of 50 GHz or less.

For this purpose, a transmission simulation was carried out to investigate a change of the transmission property Q by the dispersion and the effective sectional area of the optical fiber in the system having a transmission rate of 10 Gb/s, a channel spacing of 50 GHz or 25 GHz, 16 channels, a transmission distance of 320 km, a power per channel of 0 dBm or 2 dBm. And the results are shown in FIGS. 3 to 5.

Figure 3:
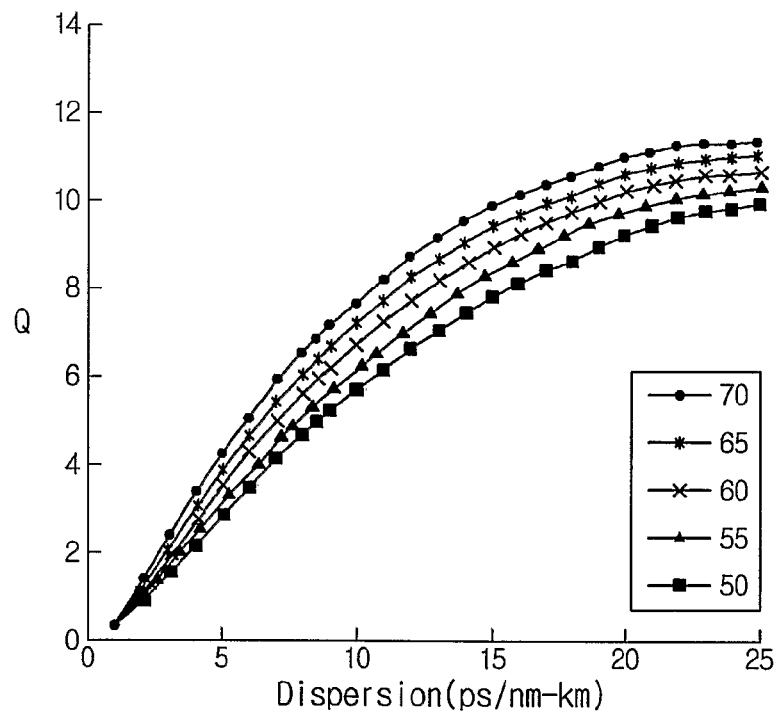
FIGS. 3 to 5 are graphs showing changes of a transmission property Q by dispersion and an effective sectional area of the optical fiber.
Figure 4:
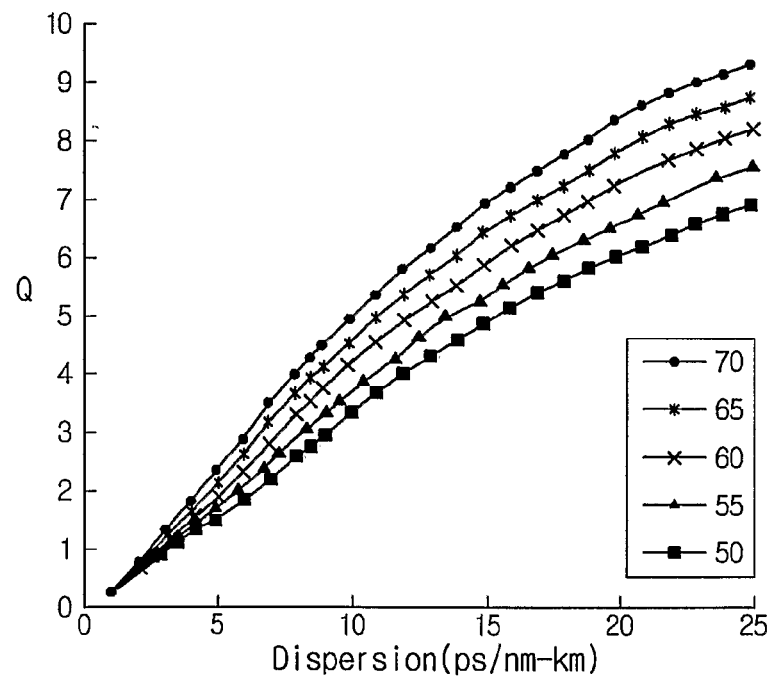
Figure 5:
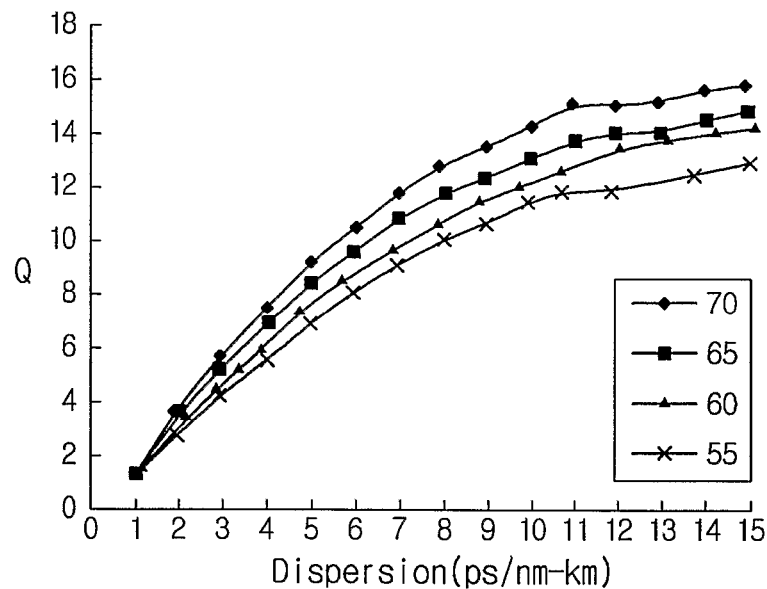

In the cases of FIGS. 3 and 4, the optical fiber has dispersion of 1~25 ps/nm-km and an effective sectional area of 50~70 μm².

Firstly, FIG. 3 shows a change of the transmission property Q by the dispersion and the effective sectional area of the optical fiber upon its 320 km transmission at a transmission rate of 10 Gb/s, a channel spacing of 25 GHz, 16 channels, and a power per channel of 0 dBm. In FIG. 3, the optical fiber should have dispersion values of at least 11 ps/nm-km and at least 10 ps/nm-km if its effective sectional area is at least 50 μm² and at least 55 μm², respectively, so as to satisfy the optical fiber having a transmission property Q of at least 6.

Also, FIG. 4 shows a change of the transmission property Q by the dispersion and the effective sectional area of the optical fiber upon its 320 km transmission at a transmission rate of 10 Gb/s, a channel spacing of 25 GHz, 16 channels, and a power per channel of 2 dBm. In FIG. 4, the optical fiber should have dispersion values of at least 17 ps/nm-km and at least 15 ps/nm-km if its effective sectional area is at least 55 μm² and at least 60 μm², respectively, so as to satisfy the optical fiber having a transmission property Q of at least 6.

In the case of FIG. 5, the optical fiber has dispersion of 1~15 ps/nm-km, and an effective sectional area of 55~70 μm².

FIG. 5 shows a change of the transmission property Q by the dispersion and the effective sectional area of the optical fiber upon its 320 km transmission at a transmission rate of 10 Gb/s, a channel spacing of 50 GHz, 16 channels, and a power per channel of 2 dBm. In FIG. 5, the optical fiber should have dispersion values of at least 5 ps/nm-km and at least 4 ps/nm-km if its effective sectional area is at least 55 μm² and at least 60 μm², respectively, so as to satisfy the optical fiber having a transmission property Q of at least 6.

It was seen from FIGS. 3 and 4 that, since the non-linearity of the optical fiber increases as the signal power increases, the transmission property Q of at least 6 is obtained only when the dispersion value increases if the optical fiber has the same effective sectional area.

It was also seen from FIGS. 4 and 5 that, though the dispersion value is relatively lower for the same effective sectional area, the transmission property Q of at least 6 is obtained if the power signal is identical and the channel spacing is widened to 2 times.

Accordingly, the optical fiber of the present invention should have a positive dispersion slope, a dispersion value of at least 9 ps/nm-km at 1,460 nm, and an effective sectional area of 45~65 μm² so as to transmit the optical signals at a transmission rate of at least 10 Gb/s and a channel spacing of 50 GHz or less in the C-L bands, as well as the S-band. That is to say, the optical fiber of the present invention has a positive dispersion slope, and therefore it has an increasing dispersion value as the positive dispersion slope approaches longer wavelength bands. Accordingly, good transmission properties may also be obtained in all wavelengths of S-C-L bands if the optical fiber has the above-mentioned dispersion value and the above-mentioned effective sectional area at 1,460 nm which is the shortest wavelength of S-band.

Also, RDS of the optical fiber according to the present invention is 0.0032~0.0038 nm$^{-1}$ which is similar to those of general single mode optical fibers (SMF) so as to enable dispersion compensation using conventional dispersion compensation elements.

EXAMPLE 1

(1) Radius: $r_1$=3.64 μm
(2) Specific refractive index difference: $\Delta_1$(%)=0.52%
(3) Zero-dispersion wavelength: 1,315 nm
(4) Dispersion
1,460 nm: 10.4 ps/nm-km, 1,530 nm: 14.5 ps/nm-km, 1,550 nm: 15.7 ps/nm-km, 1,625 nm: 19.6 ps/nm-km
(5) Dispersion slope
1,550 nm: 0.055 ps/nm²-km
(6) RDS
1,550 nm: 0.0035 nm$^{-1}$
(7) Effective sectional area
1,460 nm: 51 μm², 1,530 nm: 54 μm², 1,550 nm: 55 μm², 1,625 nm: 59 μm²

EXAMPLE 2

(1) Radius: $r_1$=3.84 μm
(2) Specific refractive index difference: $\Delta_1$(%)=0.46%

(3) Zero-dispersion wavelength: 1,312 nm
(4) Dispersion
1,460 nm: 10.8 ps/nm-km, 1,530 nm: 15.1 ps/nm-km, 1,550 nm: 16.2 ps/nm-km, 1,625 nm: 20.2 ps/nm-km
(5) Dispersion slope
1,550 nm: 0.056 ps/nm²-km
(6) RDS
1,550 nm: 0.0035 nm⁻¹
(7) Effective sectional area
1,460 nm: 57 µm², 1,530 nm: 61 µm², 1,550 nm: 62 µm², 1,625 nm: 66 µm²

EXAMPLE 3

(1) Radius: $r_1$=3.57 µm, and $r_2$=4.53 µm
(2) Specific refractive index difference: $\Delta_1$(%)=0.53%, and $\Delta_2$=0.097%
(3) Zero-dispersion wavelength: 1,313 nm
(4) Dispersion
1,460 nm: 10.7 ps/nm-km, 1,530 nm: 15.0 ps/nm-km, 1,550 nm: 16.2 ps/nm-km, 1,625 nm: 20.1 ps/nm-km
(5) Dispersion slope
1,550 nm: 0.057 ps/nm²-km
(6) RDS
1,550 nm: 0.0035 nm⁻¹
(7) Effective sectional area
1,460 nm: 52 µm², 1,530 nm: 55 µm², 1,550 nm: 56 µm², 1,625 nm: 60 µm²

EXAMPLE 4

(1) Radius: $r_1$=3.64 µm, and $r_2$=4.76 µm
(2) Specific refractive index difference: $\Delta_1$(%)=0.49%, and $\Delta_2$=0.098%
(3) Zero-dispersion wavelength: 1,313 nm
(4) Dispersion
1,460 nm: 10.9 ps/nm-km, 1,530 nm: 15.2 ps/nm-km, 1,550 nm: 16.3 ps/nm-km, 1,625 mm: 20.3 ps/nm-km
(5) Dispersion slope
1,550 nm: 0.057 ps/nm²-km
(6) RDS
1,550 nm: 0.0035 nm⁻¹
(7) Effective sectional area
1,460 nm: 56 µm², 1,530 nm: 60 µm², 1,550 nm: 61 µm², 1,625 nm: 65 m²

In the Examples 1 to 4, the radius and the specific refractive index difference may have a manufacturing tolerance of ±∝ (for example, about ±0.6 µm for the radius, and about ±0.03% for the specific refractive index difference).

Figure 6:
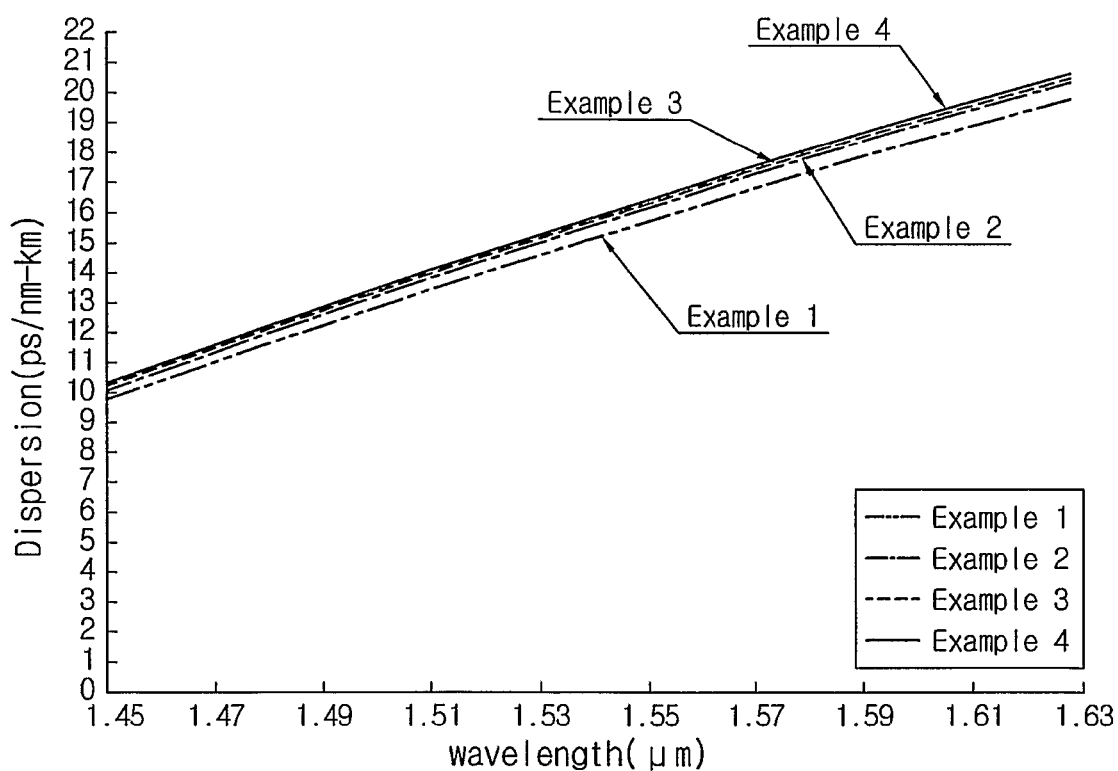
FIG. 6 is a graph showing a dispersion property for each wavelength of optical fibers according to embodiments of the present invention.

FIG. 6 shows transmission properties for each wavelength of the optical fibers corresponding to the Examples 1 to 4. All the optical fibers corresponding to the Examples 1 to 4 have dispersions of 9~20 ps/nm-km at 1,460 nm~1,625 nm and positive dispersion slopes.

Figure 7:
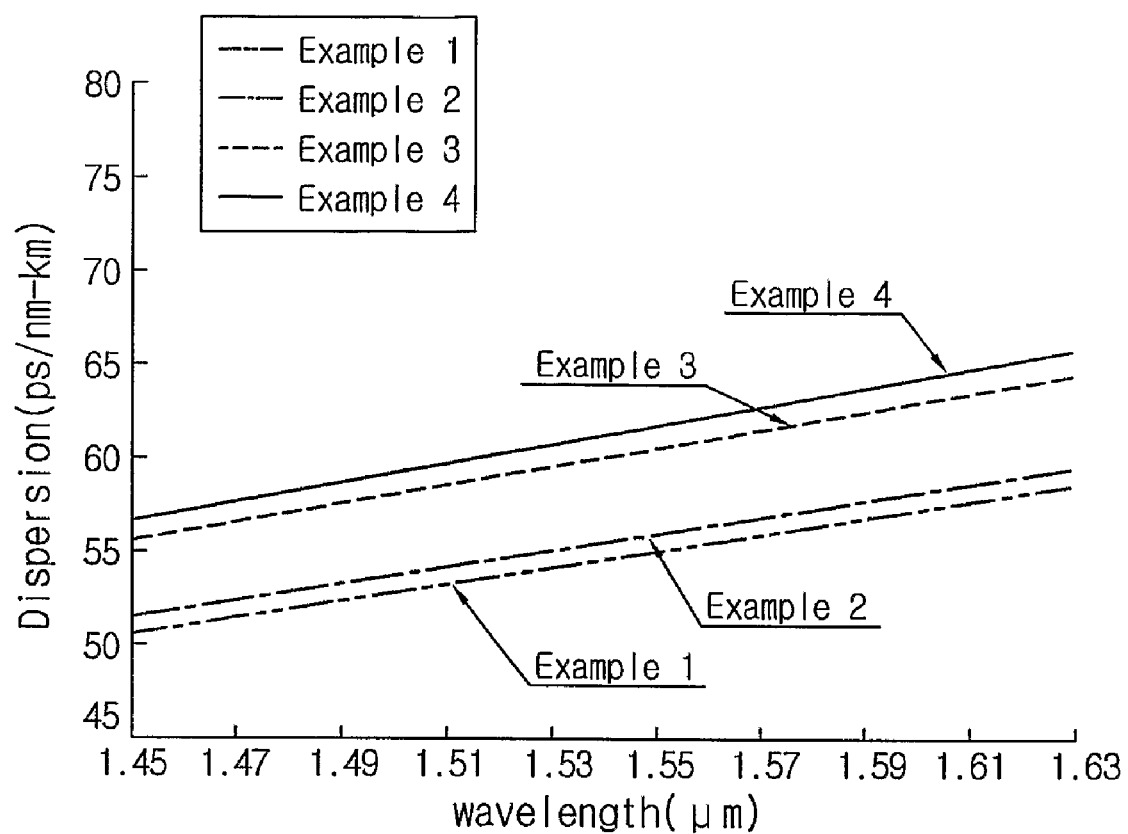
FIG. 7 is a graph showing an effective sectional area for each wavelength of an optical fiber according to embodiments of the present invention.

Also, FIG. 7 shows properties of the effective sectional area for each wavelength of the optical fibers corresponding to the Examples 1 to 4. All the optical fibers corresponding to the Examples 1 to 4 have an effective sectional area of 50 µm²~65 µm² at 1,460 nm, and also the effective sectional areas of at least 50 µm² at the C-band and the L-band.

As described above, the optical fibers corresponding to the Examples 1 to 4 may satisfy the transmission property Q of at least 6 at the C-band and the L-band, as well as the S-band in the system having the transmission rate of 10 Gb/s and the channel spacing of 50 GHz or less, and may enable about 320 km transmission without the dispersion compensation because it has the dispersion of at least 9.0 ps/nm-km and the effective sectional area of at least 50 µm² at longer wavelength bands than 1,460 nm.

It should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation.

Accordingly, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

The zero-dispersion wavelength of the optical fiber according to the present invention exists at 1,370 nm or less. Accordingly, the transmission property of the optical fiber is not deteriorated due to the cross talk between the pump signals even though Raman amplification is carried out at the S band.

Also, the optical fiber of the present invention enables the 320 km repeaterless transmission over S-C-L bands at the transmission rate of 10 Gb/s or more, the channel spacing of 50 GHz or less, 16 channels, and the signal power of 0 dBm/ch or 2 dBm/ch.

In addition, the optical fiber of the present invention enables dispersion compensation using the dispersion compensation elements for the general single mode optical fibers.

What is claimed is:

1. A single mode optical fiber for enabling wavelength division multiplexing transmission at a wavelength range of 1,460 to 1,625 nm, the optical fiber having a transmission rate of 10 Gb/s and a channel spacing of 50 GHz or less, and comprising:
    (a) a core region positioned in an optically central axis and having a radius ($r_1$) from the optically central axis and a specific refractive index difference ($\Delta_1$); and
    (b) a clad region surrounding the core region and having a radius ($r_2$) from the optically central axis and a specific refractive index difference ($\Delta_2$);
    the optical fiber also having:
    (c) a stepped refractive index profile where each radius of the regions is $r_1 < r_2$, and the specific refractive index difference is $\Delta_1 > \Delta_2$, and $\Delta_1 > 0$;
    (wherein, $\Delta_1(\%) = [(n_{core} - n_{clad})/n_{clad}] \times 100$, $n_{core}$: a refractive index of the core region, $n_{clad}$: a refractive index of the clad region)
    wherein,
    (d) a dispersion value of at least 9 ps/nm-km at 1,460 nm;
    (e) an effective sectional area of 45 µm²~65 µm² at 1,460 nm; and
    (f) a zero-dispersion wavelength existing at 1,370 nm or less, and a positive dispersion slope.

2. The single mode optical fiber according to the claim 1, wherein RDS (Relative Dispersion Slope) is 0.0032~0.0038 nm⁻¹ at 1,550 nm.

3. The single mode optical fiber according to the claim 1, wherein the core region has the radius ($r_1$) of 3.5~4.1 µm, and the specific refractive index difference ($\Delta_1$) of 0.4~0.6%.

4. The single mode optical fiber according to the claim 1, wherein the core region has the radius $r_1$ of 3.56~4.00 μm, and the specific refractive index difference ($\Delta_1$) of 0.46~0.56%.

5. A single mode optical fiber for enabling wavelength division multiflexing transmission at a wavelength range of 1,460 to 1,625 nm, the optical fiber having a transmission rate of 10 Gb/s and a channel spacing of 50 GHz or less, and comprising:
 (a) a first core region positioned in an optically central axis and having a radius ($r_1$) from the optically central axis and a specific refractive index difference ($\Delta_1$);
 (b) a second core region surrounding the first core region and having a radius ($r_2$) from the optically central axis and a specific refractive index difference ($\Delta_2$); and
 (c) a clad region surrounding the second core region, and has a radius ($r_3$) from the optically central axis and a specific refractive index difference ($\Delta_3$); and
 the optical fiber also having:
 (d) a stepped refractive index profile where each radius of the region is $r_1<r_2<r_3$, and the specific refractive index difference is $\Delta_1>\Delta_2>\Delta_3$, and $\Delta_1, \Delta_2>0$;
 (wherein, $\Delta_1(\%)=[(n_1-n_c)/n_c]\times 100$, $\Delta_2(\%)=[(n_2-n_c)/n_c]\times 100$, $n_1$: a refractive index of the first core region, $n_2$: a refractive index of the second core region, $n_c$: a refractive index of the clad region)
 (e) a dispersion value of at least 9 ps/nm-km at 1,460 nm;
 (f) an effective sectional area of 45 μm²~65 μm² at 1,460 nm; and
 (g) a zero-dispersion wavelength existing at 1,370 nm or less, and a positive dispersion slope.

6. The single mode optical fiber according to the claim 5, wherein RDS (Relative Dispersion Slope) is 0.0032~0.0038 nm$^{-1}$ at 1,550 nm.

7. The single mode optical fiber according to the claim 5,
 i) wherein the first core region has the radius ($r_1$) of 3.05±0.6 μm, and the specific refractive index difference ($\Delta_1(\%)$) of 0.53±0.03%; and
 ii) wherein the second core region has the radius ($r_2$) of 4.53±0.6 μm, and the specific refractive index difference ($\Delta_2$) of −0.097±0.03%.

8. The single mode optical fiber according to the claim 5, wherein i) the first core region has the radius ($r_1$) of 3.64±0.6 μm, and the specific refractive index difference ($\Delta_1(\%)$) of 0.49±0.03%; and
 ii) wherein the second core region has the radius ($r_2$) of 4.76±0.6 μm, and the specific refractive index difference ($\Delta_2$) of −0.098±0.03%.

9. An optical transmission line employing the single mode optical fiber defined in the claim 1 or 5.

10. An optical communication system employing the optical transmission line defined in the claim 9 as at least a part of the optical transmission line.

* * * * *